Feb. 11, 1964   P. H. SECKEL   3,120,963
SHIELD MEMBER FOR SLED-LIKE VEHICLES
Filed May 4, 1962

INVENTOR.
PETER HOWARD SECKEL
BY
Morgan, Finnegan, Durham & Pine
ATTORNEYS

# United States Patent Office 3,120,963
Patented Feb. 11, 1964

3,120,963
SHIELD MEMBER FOR SLED-LIKE VEHICLES
Peter H. Seckel, Wayne, N.J., assignor to Colorite Plastics, Incorporated, Paterson, N.J., a corporation of Delaware
Filed May 4, 1962, Ser. No. 192,450
1 Claim. (Cl. 280—28)

The present invention relates to shield members, and more particularly, to a novel shield member for the runner elements of sled-like vehicles which provides improved sliding and riding characteristics.

Such sled-like vehicles are generally distinguished from toboggans by the fact that the latter are not supported by runners. The weight of a toboggan and its occupant is carried by the flat relatively wide under-surface of the toboggan whereas the weight of the conventional sled and its occupant is carried by the thin, narrow runners.

The runner elements of the conventional sled-like vehicles are usually formed of metal, preferably steel, which has a relatively low coefficient of friction on dry snow. However, on wet snow, this coefficient of friction increases; and, the movement of the sled over wet snow is difficult. Further, the metallic runners are subject to corrosion and rusting which interfere with smooth sled operation.

The present invention is characterized by the provision of a novel sled runner shield. This shield is of generally channel-shaped cross-section and is provided with a concave bottom riding surface. The shield member is frictionally held on the sled runners and clamped in place by means of a pair of opposed upper lip sections disposed over the top of the metal runners and inclined theretoward. The concave bottom section reduces the runner contact area, avoiding excessive friction while the biting edges on either side of the concave section provide a grip on snow and steering control.

The shield member is formed of a plastic material having a degree of flexibility for placement on the runner member. In addition, the plastic material has sufficient abrasion resistance and low temperature plasticity. A suitable plastic for the shield material includes one of the polyolefines having a preferable density of from .935 to .970 g./cc. and a melt index of 0.1 to 10. To further reduce the coefficient of friction of the plastic shield, a "slip agent" may be incorporated into the plastic material. A suitable agent has been found to be an amide of a fatty acid such as stearic, oleic or palmitic acid. It has been found advantageous to incorporate such "slip agent" in amounts of .05 to .5% of the total shield material.

Objects

It is, therefore, an object of the present invention to provide a shield member for the runner elements of a vehicle such as a sled, which improves the riding characteristics thereof on snow and provides, particularly, superior riding characteristics on wet as well as dry snow.

It is another object of the present invention to provide a removable shield member for the runner elements of a sled-like vehicle, the shield element being of a generally channel-shaped cross-section, having a concave bottom riding surface and a pair of opposed upper lip sections for maintaining the shield in position on the runner.

An added object of the invention is to provide a plastic shield member for use with the support for a vehicle designed to slide on ice and snow, the shield member being formed of a combination of high-density polyolefine and the amide of a fatty acid.

A further object of the present invention is to provide a plastic shield member for the runner elements of a sled, said shield member being formed of polyolefine having a density range of from .935 to .970 g./cc. and a melt index range of 0.1 to 10, and including from .05 to .5% of an amide of a fatty acid.

Other objects and advantages of the invention will be obvious herefrom, or may be learned by practice with the invention, the same being realized and attained by means of the instrumentalities and combinations pointed out in the appended claim.

The foregoing general description and the following detailed description are exemplary and explanatory but are not restrictive of the invention.

Of the drawings illustrating, by way of example, a preferred embodiment of the invention:

Figure 1:
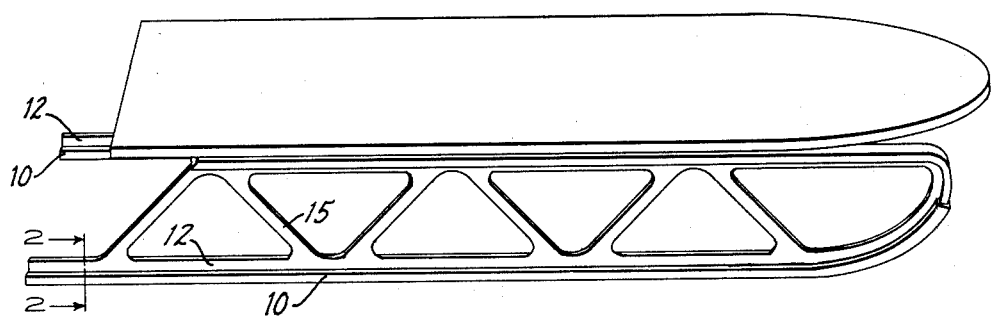
FIGURE 1 is a perspective view illustrating the embodiment of the present invention disposed in operative position on the runner element of a sled.

Referring to the drawings, there is illustrated a plastic shield member (designated generally 10) embodying the preferred embodiment of the present invention. Shield 10 is shown in operative position on one of the runners 12 of a conventional sled 14. As will be noted from the drawings, shield member 10 is substantially coextensive with the terrain contacting portion of runner 12.

Figure 2:
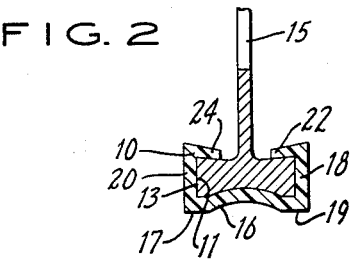
FIGURE 2 is a sectional view taken along lines 2—2 of FIGURE 1.

Referring specifically to FIGURE 2, shield member 10 is of a generally channel-shaped cross-section and includes a concave bottom riding surface 16, opposed side surfaces 18 and 20, and spaced upper lip sections 22 and 24, secured to or formed with sides 18 and 20, respectively. Shield member 10 is adapted to be snapped into its operative position with the inner surface 11 of shield 10 in intimate contact with the outer surface 13 of runner 12, as shown in FIGURE 2. The upper lip sections 22 and 24 are preferably formed slightly inclined toward runner strut 15 as shown best in FIGURE 2. This arrangement contributes to the frictional engagement between shield 10 and runner 12, and assists in maintaining shield 10 in position on its associated runner 12.

By forming the bottom 16 as an inwardly-domed concave element, the runner contact area is decreased, reducing the sled's sliding friction. Further, by providing broader and wider-spaced runner edges 17 and 19 for sled 14 on either side of concave bottom 16, better steering is provided. Edges 17 and 19 improve the sled grip on the snow, thereby improving the guiding and handling characteristics of sled 14.

The plastic material of which shield 10 is formed must be sufficiently pliable to be readily snapped into position on runner 12. Further, it should possess good abrasion resistance and low-temperature plasticity. It has been found that a suitable plastic material is linear polyethylene, preferably of the high density type. Suitable results are obtained by forming shield 10 of a polyolefine having a density range of from .935 to .970 g./cc. and with a melt index of from 0.1 to 10. A suitable material is commercially available from Phillips Chemical Co., Bartlesville, Oklahoma, under the trade name "Marlex 5040."

It has been found advantageous to incorporate into the plastic material of which shield 10 is formed an agent for further reducing the coefficient of friction of shield 10. A suitable agent for this purpose has been found to be an amide of a fatty acid, such as stearic, oleic and palmitic. Preferably, this agent constitutes from .05 to .5% of the total material forming shield 10. In this range, the additive agent slowly bleeds to the bottom surface of shield 10, producing a waxy and slippery coating on the terrain contacting portions of shield 10. In the event this coating is removed by scratches or nicks during the course of use of shield 10, additional agent bleeds out from the interior of shield 10 to renew the surface slip.

Thus, there is provided a relatively simple, inexpensive shield for the runner elements of a sled which greatly improves the riding characteristics of the sled, improves the steering control thereof, and provides a degree of protection against injuries by covering the sharp edges of the runners. Embodiments of the invention have a relatively low coefficient of friction and superior sliding characteristics on both wet and dry snow. No difficulty in moving the sled of the invention over wet snow is encountered.

If desired, the shields 10 may be formed in any number of a variety of colors to provide a method of color-coding for the sleds.

What is claimed is:

A shield member for the runners of sleds, said shield member having a generally channel shaped cross section and being adapted to be removably secured and disposed around said runners and in frictional engagement therewith, said shield being formed of a material comprising a combination of a polyolefin and the amide of a fatty acid, the polyolefin having a density in the range of from 0.935 to 0.970 g./cc. and with a melt index in the range of 0.1 to 10, and said amide being present in amounts of 0.05 to 0.5% of the total material forming said shield member.

References Cited in the file of this patent

UNITED STATES PATENTS

| | | |
|---|---|---|
| 1,670,226 | Anderson | May 15, 1928 |
| 2,016,187 | Vincent | Oct. 1, 1935 |
| 2,938,879 | Mock | May 31, 1960 |
| 3,034,800 | Campbell | May 15, 1962 |

FOREIGN PATENTS

| | | |
|---|---|---|
| 340,139 | Switzerland | Sept. 30, 1959 |